United States Patent [19]
Lyberg

[11] Patent Number: 5,694,520
[45] Date of Patent: Dec. 2, 1997

[54] METHOD AND DEVICE FOR SPEECH RECOGNITION

[75] Inventor: Bertil Lyberg, Vagnhaerad, Sweden

[73] Assignee: Telia AB, Farsta, Sweden

[21] Appl. No.: 532,823

[22] PCT Filed: Jun. 13, 1995

[86] PCT No.: PCT/SE95/00710

§ 371 Date: Jan. 11, 1996

§ 102(e) Date: Jan. 11, 1996

[87] PCT Pub. No.: WO96/00962

PCT Pub. Date: Jan. 11, 1996

[30] Foreign Application Priority Data

Jun. 29, 1994 [SE] Sweden ................... 9402284

[51] Int. Cl.$^6$ .......................................... G10L 5/06
[52] U.S. Cl. ................. 395/2.63; 395/2.16; 395/2.64
[58] Field of Search ........................ 395/2.86, 2.6, 395/2.63, 2.64, 2.66, 2.09, 2.14, 2.16, 2.2

[56] References Cited

U.S. PATENT DOCUMENTS

5,581,655  12/1996  Cohen et al. ................. 395/2.54

FOREIGN PATENT DOCUMENTS

0 674 307  9/1995  European Pat. Off. .
9303623    5/1995  Switzerland .

OTHER PUBLICATIONS

Speech Communication, vol. 15, No. 3–4, pp. 169–186, Dec. 1994, P. Taylor, "The Rise/Fall/Connection Model of Intonation".

European Conference on Speech Communication and Technology, pp. 38–44, Sep. 1989, R. Collier, "Intonation Analysis: The Perception of Speech Melody in Relation to Acoustics and Production".

Patent Abstracts of Japan, vol. 17, No. 707, JP-A-5-241596, Sep. 21, 1993.

Proceedings of the International Conference on Acoustics, vol. 2, pp. 773–776, 1990, J.W. Butzberger, Jr., et al., "Isolated Word Intonation Recognition Using Hidden Markov Models".

*Primary Examiner*—Kee M. Tung
*Attorney, Agent, or Firm*—Oblon, Spivak, McClelland, Maier & Neustadt, P.C.

[57] ABSTRACT

A method and device for recognizing dialectal variations in a language. From an incoming speech is on one hand a speech recognition procedure being performed, and on the other hand the fundamental tone curve being extracted. Out of the speech recognition is created an allophone string which together with the fundamental tone curve is used for the detecting of the maximun and minimum values of the fundamental tone. The recognized speech is compared with a lexicon with orthography and transcription for the finding of suitable word candidates. The found word candidates are further analyzed regarding syntax. This in mentioned way found syntactical and lexical information is used for creating a model of the speech. The fundamental tone outline of the model and the fundamental tone of the speech are compared, at which the maximun and minimum values of the fundamental tones are appointed and a difference between the model and the speech are obtained. The difference is after that influencing the model which is brought to correspond to the given speech. The in mentioned way modelled model is then used for the speech recognition, at which an increased possibility to understand the different dialects of a language in an artificial way is achieved.

20 Claims, 2 Drawing Sheets

Dialect B

METHOD AND DEVICE FOR SPEECH RECOGNITION

BACKGROUND OF THE INVENTION

1. Field of the Invention

The present invention relates to artificial recognition of different dialects in a language.

2. Discussion of the Background

In speech recognition it is previously known to use speech recognition equipment of different kinds. In classical systems the speech recognition equipment is trained to recognize speech from a large number of persons. The information which is at this achieved is after that used for interpretation of speech coming in to the equipment. The speech recognition equipment is at this trained to recognize speech that follows practised dialects. Dialectal variations in speech outside the practised dialects is with this type of speech recognition equipments not generally interpretable.

In languages with tone word accents and tone language the intonation constitutes a very important part in the understanding of the language. In the previously known technology no consideration has been taken to these considerations. The consequence of this is that the interpretation of words and phrases have been misinterpreted at artificial speech recognition. To the extent speech recognition equipments have been constructed to manage dialects in a speech, these euipments have been especially constructed for the dialect in question.

In the future speech recognition equipments will, to an ever increasing extent, be used in different connections. The speech recognition equipments shall in this connection be capable to recognize different dialects in a language. The dialectal variations in a language have been difficult to describe in one for the machine useful way. The artificial understanding of speech has not in this connection given a satisfying result. Further, there is a wish to find methods which are generally applicable to different languages.

The above mentioned problems have implied that artificial interpretation of speech have been difficult or impossible to perform due to dialectal variations. General methods are therefore of greatest importance.

Beside the pure technical problems to interprete a speech there are strong wishes that the speech shall be possible to interprete in order to control different types of equipments and services in for instance a telecommunication network.

The present invention is intended to solve above mentioned problems.

SUMMARY OF THE INVENTION

The present invention firstly relates to a method to, out of a given speech, recognize dialectal variations in a language. For this purpose a speech recognition equipment is adapted to recognize different dialects in the language. From the speech a fundamental tone curve is extracted and its maximum and minimum values are identified. Out of the speech is further a speech recognition performed from which a model of the speech is created by means of lexicon and syntax analysis. The achieved model is given a standard intonation. The maximum and minimum values of the fundamental tone curves of the speech and the model respectively is compared with each other. A time difference between the maximum and minimum value occurrances in the fundamental tone curve of the speech and the fundamental tone curve of the model respectively is obtained.

This time difference has an effect on the model. The model will at this be adapted to the intonation of the speech. In this way a model of the speech is obtained which, regarding dialect, corresponds to the incoming speech. In this way an improved possibility is achieved to interpret a given speech.

In a further development of the invention a reference is used for determining the time difference at which preferably a CV-limlit is used. Further, the outline of the fundamental tone is based on lexical and syntactic information. In the lexical information is included information about orthography and phonetic transcription. The transcription includes lexical abstract accent information type stressed syllable, toned word accents of type accent 1 and accent 2, and the location of secondary accent, i.e. information given for instance in dictionaries.

The invention further relates to an equipment for recognizing dialectal variants in a language. The speech recognition equipment is arranged to, out of a speech, recognize and interpret the language. A model instrument is arranged to, out of the information from the speech recognition equipment, create a model of the speech. The model instrument extracts the fundamental tone of the speech and appoints the time when the maximum and minimum values of the fundamental tone occur. The model instrument compares the points of time for the occurrance of the maximum and minimum values in the speech, and the instrument appoints the time difference between them. After that the model instrument adjusts the model to correspond to the intonation of the speech, at which an artificial interpretation of the speech is made possible. In the model instrument there are further a lexicon arranged with information of orthography and transcription, out of which the model is created. Further the model instrument analyses the lexical information syntactically at which the model in the initial phase is brought to correspond to one in the language standardized pattern. The means further categorize the speech in different dialect categories on the basis of stored intonation descriptions.

The present invention refers to a method and device to, from a given speech, recognize dialectal variations in a language. Out of an incoming speech is on one hand a speech recognition procedure performed, and on the other hand is the fundamental tone extracted. From the speech recognition an allophone string is created which in combination with the fundamental tone curve is used for detecting of maximum and minimum values of the fundamental tone. The recognized speech is compared with a lexicon with orthography and transcription for finding suitable word candidates. The found word candidates are further analyzed syntactically. This in that way found syntactic and lexical information is used for the creation of a model of the speech. The outline of the fundamental tone is compared with the fundamental tone of the speech at which the maximum and minumum values of the fundamental tone is appointed and a difference between the model and the speech is obtained. The difference after that has an influence on the model which is brought to correspond to the given speech. This in mentioned way modelled model is after that used for the speech recognition at which an increased possibility to understand the different dialects of a language in an artificial way is achieved.

The invention has among other things the advantages that the dialects in a language are interpretable. The interpretation can be made without the different dialect variants having been brought into the speech recognition equipment. In this way the speech recognition equipment can be made considerably smaller than what is possible with the present technology. This implies further that space is saved. It is further possible to identify particular dialects and exclude others at the speech recognition procedure. By dialectal variations in the language being interpretable it will be possible to use the speech in different situations. For instance can speech be used for controlling different equipments, e.g. to switch on an off heating equipment, pump stations etc. Further it is possible to use the speech in connection with the use of different services, for example telecommunication and bank services of different kinds without making use of codes.

DETAILED DESCRIPTION OF THE PREFERRED EMBODIMENTS

In the following the invention is described on the basis of the figures with references to the notations therein.

The device can be used for arbitrary languages, however preferably for languages with toning word accents and toning languages. The examples in the following are taken from the swedish language where a detailed knowledge of how word accents and sentence accents are realised in different dialects. The description of intonation in swedish is straight applicable to, for instance, the norwegian language.

Out of the incoming signal the fundamental tone is extracted by (2). From the fundamental tone curve FO(t) are in (6) detected the extreme values FO-max and FO-min and their positions the the allophone string. The information is compared in comparator (7) with one in (5) model generated variant of the speech. The time difference i relation to a reference usually CV-limit (C=consonant; V=vowel), is detected and fed back to the model generator (5) for correction of time for the fundamental tone events in the present word regarding the word accent.

The model generator is basing the generated fundamental tone outline on information from lexicon (orthography and transcription) and syntactic information. The transcription contains lexical abstract accent information of type stressed syllable, the toning word accents I and accent II, and the location of secondary accent, i.e. information which one normally finds in a dictionary. After correction of the model generator to the dialect in question, the fundamental tone information can be used to support the speech recognition equipment at the selection of possible candidates.

By information about the point of time for present FO-events it is possible to in (5) classify the incoming speech in dialect categories depending on stored descriptions of intonation.

Figure 1:
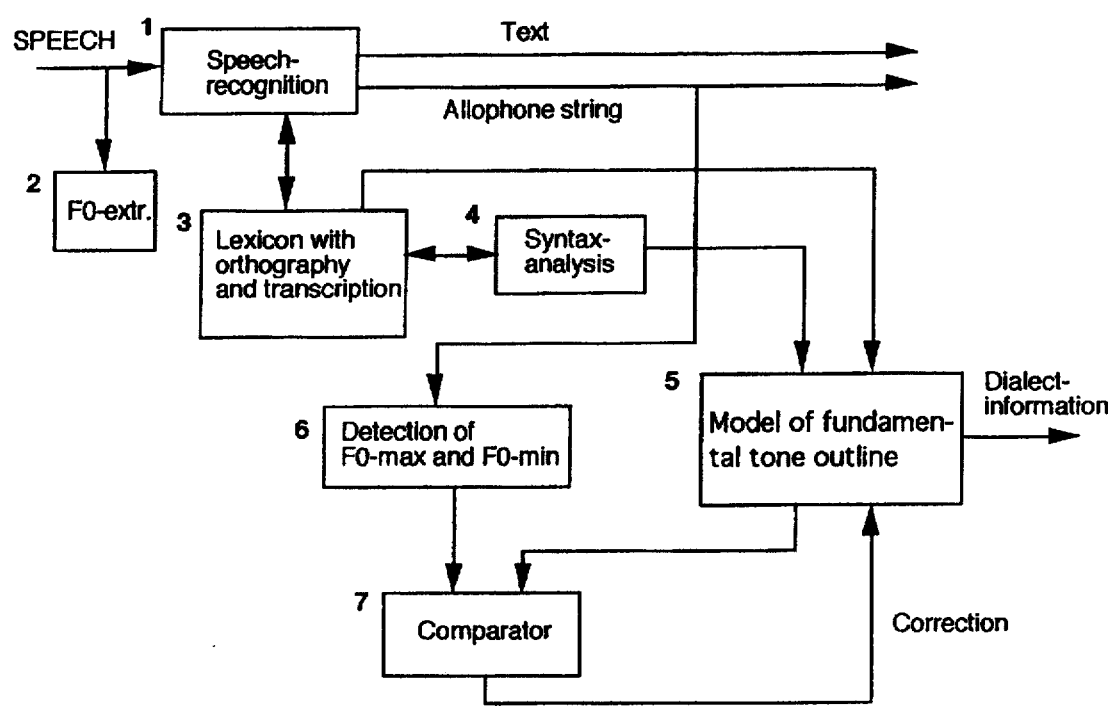
FIG. 1 shows the build-up of the invention in a schematic form.
Figure 2:
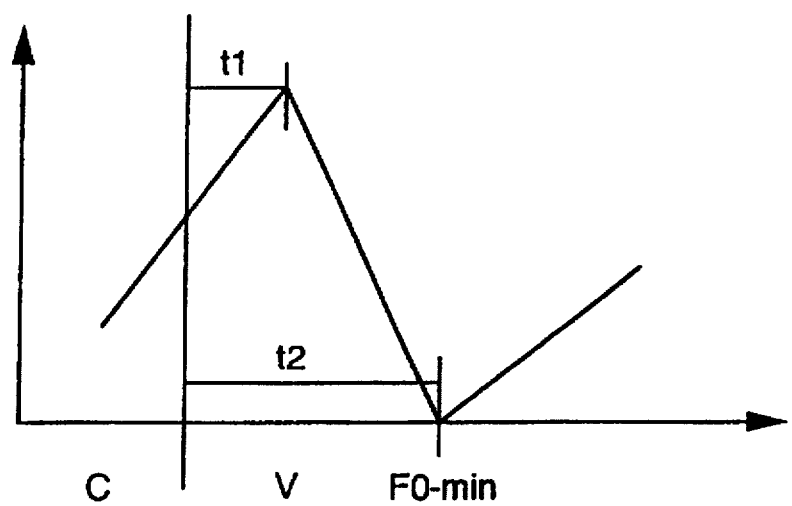
FIG. 2 shows the locations of maximum and minimum values in a fundamental tone for dialect A.
Figure 3:
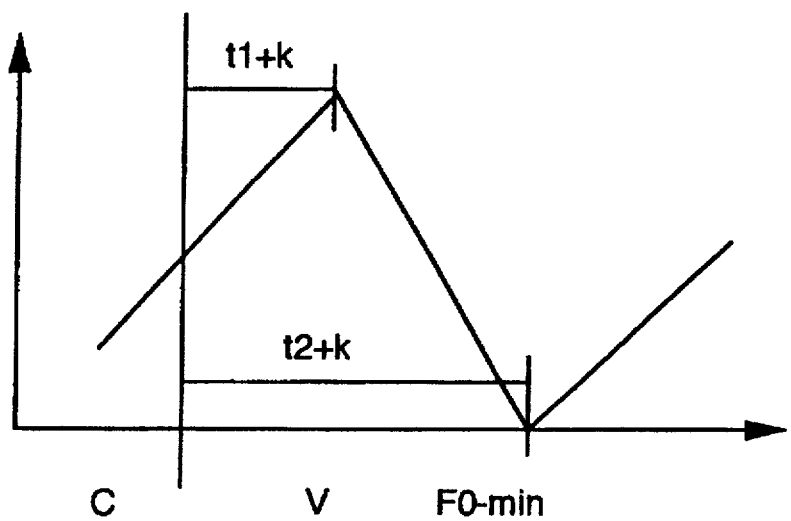
FIG. 3 shows the maximum and minimum values in the fundamental tone for an imagined dialect B.

In FIG. 2 is shown example of how the word accent (accent II, i.e. grave) is schematically realised in two different swedish dialects. The difference of intonation between different dialects in the swedish language can be described by different points of time for word and sentence accent. This is described in FIG. 3 where the maximum and minimum values of the fundamental tone curve have been displaced a space of time k in relation to dialect A.

A speech is coming in and out of the speech is extracted on one hand the fundamental tone curve, and on the other hand a speech recognition is performed where an allophone string is created. From the fundamental tone curve and the allophone string the maximum and minimum values of the fundamental tone curve is identified and their location. Out of the information from the speech recognition is further a lexical identification of the speech performed, and a syntax analysis of the received speech is made. The lexical and syntactical information after that constitute the base for creation of a model of the given speech. The model which is created is given for example one for the language nationally standardized intonation or a training in a number of dialects of the language. After that the maximum and minimum values of the fundamental tone curves in the speech and the model respectively are compared. The time difference which at that is obtained between the occurrances of the maximum and minimum values of the fundamental tone curves in the model is after that used for correction of the model. In this way a dialectal information is obtained which is used for interpretation of the speech. This in mentioned way obtained model which corresponds to the character of the dialect is after that used for increased understanding of the given speech.

I claim:

1. A method for recognizing spoken language comprising the steps of:
    identifying a number of phonemes from a segment of input speech;
    interpreting the phonemes as possible word combinations to establish a model of the speech with word and sentence accents according to a standardized pattern;
    determining the fundamental tone curve of the input speech;
    determining the maximum and minimum values of the fundamental tone curve of the input speech and their respective positions;
    determining the maximum and minimum values of the fundamental tone curve of the speech model;
    comparing the fundamental tone curve of the input speech and the fundamental tone curve of the speech model to identify a time difference between the maximum and minimum values of the fundamental tone curve of the incoming speech in relation to the maximum and minimum values of the fundamental tone curve of the speech model; adjusting the intonation pattern of the speech model utilizing the identified time difference to modify the speech model to conform with the dialectal characteristics of the input speech.

2. Method according to claim 1, characterized by the time difference being appointed in relation to a reference, preferably a CV-limit, where C indicate a consonant and V a vowel.

3. Method according to claim 2 characterized by the fundamental tone outline being based on lexical and syntactical information, and information about orthography and fonetic transcription.

4. Method according to claim 3, characterized by the speech on the basis of FO-events being classified in dialect categories depending on stored information descriptions.

5. Method according to claim 2, characterized by the transcription containing a lexical abstract accent information type stressed syllable, tonal word accents, accent I and accent II as well as location of secondary accent, i.e., information normally provided by dictionary.

6. Method according to claim 2, characterized by the speech on the basis of FO-events being classified in dialect categories depending on stored information descriptions.

7. Method according to claim 1, characterized by the fundamental tone outline being based on lexical and syntactical information, and information about orthography and fonetic transcription.

8. Method according to claim 7, characterized by the transcription containing a lexical abstract accent information type stressed syllable, tonal word accents, accent I and accent II as well as location of secondary accent, i.e., information normally provided by dictionary.

9. Method according to claim 7, characterized by the speech on the basis of F0-events being classified in dialect categories depending on stored information descriptions.

10. Method according to claim 1, characterized by the transcription containing a lexical abstract accent information type stressed syllable, tonal word accents accent I and accent II as well as location of secondary accent, i.e. information normally provided by dictionary.

11. Method according to claim 10, characterized by the speech on the basis of F0-events being classified in dialect categories depending on stored information descriptions.

12. Method according to claim 1, characterized by the speech on the basis of F0-events being classified in dialect categories depending on stored information descriptions.

13. A device for recognizing spoken language comprising:

speech recognition means for identifying a number of phonemes from a segment of input speech;

interpretation means for interpreting the phonemes as possible word combinations to establish a model of speech having word and sentence accents according to a standardized pattern;

extraction means for extracting a fundamental tone curve of the input speech;

first analyzing means for determining the maximum and minimum values of the fundamental tone curve and their respective positions;

second analyzing means for determining the maximum and minimum values of the fundamental tone curve of the speech model and their respective positions;

comparison means for comparing the input speech with the speech model to identify a time difference between the occurrence of the maximum and minimum values of the fundamental tone curve of the incoming speech in relation to the maximum and minimum values of the fundamental tone curve of the speech model;

correction means for adjusting the intonation pattern of the speech model utilizing the identified time difference, to modify the speech model to conform with the dialectal characteristics of the input speech.

14. Device according to claim 13, characterized by the model instrument being arranged to, from a lexicon with orthography and transcription, create a model of the speech.

15. Device according to claim 14, characterized by the model instrument being arranged to analyze the lexical information regarding syntax at which the model is brought to correspond to one in the language standardized pattern.

16. Device according to claim 15, characterized by the device being arranged to categorize the speech in different dialect categories on the basis of stored intonation descriptions in the device.

17. Device according to claim 14, characterized by the device being arranged to categorize the speech in different dialect categories on the basis of stored intonation descriptions in the device.

18. Device according to claim 13, characterized by the model instrument being arranged to analyse the lexical information regarding syntax at which the model is brought to correspond to one in the language standardized pattern.

19. Device according to claim 18, characterized by the device being arranged to categorize the speech in different dialect categories on the basis of stored intonation descriptions in the device.

20. Device according to claim 13, characterized by the device being arranged to categorize the speech in different dialect categories on the basis of stored intonation descriptions in the device.

* * * * *